United States Patent
McKinley et al.

(10) Patent No.: US 7,454,007 B2
(45) Date of Patent: Nov. 18, 2008

(54) TELECOMMUNICATION SWITCH USING GENERIC API TO SUPPORT MULTIPLE PROTOCOL-SPECIFIC SIGNAL CONTROL FUNCTIONS

(75) Inventors: Michael D. McKinley, Garland, TX (US); Matt M. Wu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 10/810,493

(22) Filed: Mar. 26, 2004

(65) Prior Publication Data
US 2005/0223391 A1    Oct. 6, 2005

(51) Int. Cl.
*H04M 7/00* (2006.01)
(52) U.S. Cl. .................. 379/221.09; 379/221.11; 379/221.12; 379/229; 455/414.1; 705/28; 719/328
(58) Field of Classification Search ............ 379/221.09, 379/221.11, 221.12, 229; 455/414.1; 705/28; 719/328
See application file for complete search history.

(56) References Cited

U.S. PATENT DOCUMENTS

| | | | | |
|---|---|---|---|---|
| 6,088,749 A | * | 7/2000 | Hebert et al. | 710/105 |
| 6,094,479 A | * | 7/2000 | Lindeberg et al. | 379/220.01 |
| 6,594,685 B1 | * | 7/2003 | Mishra et al. | 709/203 |

OTHER PUBLICATIONS

Lucent Technologies, Inc.—EXS Converged Services Platform Product Overview—2001.*
Lucent Technologies, Inc.—News Release for EXS Converged Services Platform Mar. 13, 2001.*

* cited by examiner

*Primary Examiner*—Ahmad F. Matar
*Assistant Examiner*—Khai N Nguyen

(57) ABSTRACT

A switch for use in a telecommunication network is provided that includes a plurality of call control agent functions and a call control function. At least two of the call control agent functions are associated with different signaling protocols. The signaling protocols define a plurality of signaling control primitives. The call control function is operable to control routing of telephone calls through the switch. The call control function is accessed using an application programming interface (API). The API includes a plurality of classes defining objects representing the signaling control primitives.

17 Claims, 4 Drawing Sheets

TELECOMMUNICATION SWITCH USING GENERIC API TO SUPPORT MULTIPLE PROTOCOL-SPECIFIC SIGNAL CONTROL FUNCTIONS

TECHNICAL FIELD OF THE INVENTION

The present invention relates generally to telecommunication switches and, more specifically, to a telecommunication switch that uses a generic application programming interface (API) to support multiple protocol-specific signal control functions.

BACKGROUND OF THE INVENTION

Conventional telecommunication networks often include various pieces of equipment that communicate using different signaling protocols. For example, a telecommunication network could include switches that support Plain Old Telephony System (POTS) protocols, Session Initiation Protocol (SIP) protocols, and the ISDN (Integrated Services Digital Network) User Part (ISUP) protocols. Conventional telecommunication switches are often required to support multiple signaling protocols.

A problem with conventional telecommunication switches is that they often use interfaces that are specifically designed for particular signaling protocols. This typically means that the interfaces cannot be easily extended or reused. As a result, when a new signaling protocol is to be added to a network, programmers often need to create a completely new interface to support the new signaling protocol. The need to create a new interface typically increases the expense of using the new signaling protocol, delays the use of the new signaling protocol, and increases the cost of maintaining the telecommunication switches.

Therefore, there is a need in the art for a telecommunication switch that is not limited by signaling protocol-specific interfaces. In particular, there is a need for a telecommunication switch that implements an interface that is compatible with multiple signaling protocols and that is easy to modify and extend.

SUMMARY OF THE INVENTION

In accordance with the present invention, a telecommunication switch that uses a generic application programming interface (API) to support multiple protocol-specific signal control functions is provided that substantially eliminates or reduces disadvantages and problems associated with conventional systems.

According to one embodiment of the present invention, a switch is provided that includes a plurality of call control agent functions and a call control function. At least two of the call control agent functions are associated with different signaling protocols. The signaling protocols define a plurality of signaling control primitives. The call control function is operable to control routing of telephone calls through the switch. The call control function is accessed using an application programming interface (API). The API includes a plurality of classes defining objects representing the signaling control primitives.

According to another embodiment of the present invention, a method is provided that includes identifying a plurality of signaling control primitives associated with a signaling protocol. The method also includes identifying one or more first classes associated with an API to a call control function in a switch. The method further includes extending one or more second classes associated with the API. The one or more first classes and the one or more second classes define objects represent the signaling control primitives. In addition, the method includes allowing access to the call control function using the signaling protocol.

Technical advantages of one or more embodiments of the present invention include providing an improved telecommunication switch that uses a generic API to support multiple protocol-specific signal control functions. In a particular embodiment, the telecommunication switch supports a generic API, which uses object-oriented concepts to take into account the various differences between the different signaling protocols. As a result, a single API can support the use of multiple signaling protocols. Moreover, when a new signaling protocol is added to a network, programmers can simply reuse and extend existing classes in the generic API to support the specific requirements of the new signaling protocol. As a result, the programmers may not need to create an entirely new interface for the new signaling protocol. Accordingly, the present invention may help to reduce the expense of using the new signaling protocol, reduce delays in using the new signaling protocol, and decrease the cost of maintaining a telecommunication network.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunication switch, router, or other device, apparatus, or system.

Figure 1:
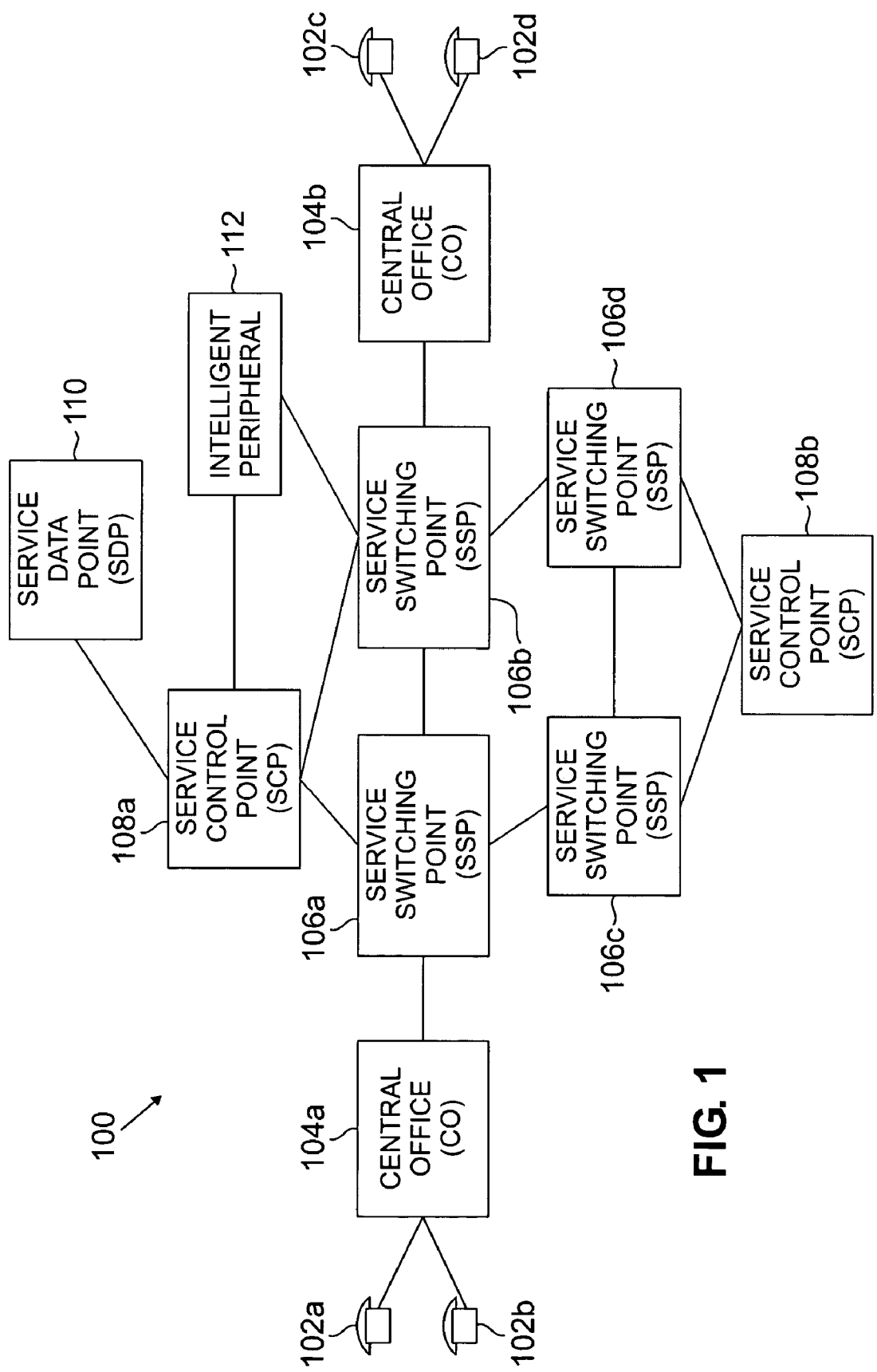
FIG. 1 is a block diagram illustrating a telecommunication system according to one embodiment of the present invention.

FIG. 1 illustrates a telecommunication system 100 according to one embodiment of the present invention. According to this embodiment, the telecommunication system 100 comprises telephones 102a-102d, central offices 104a-104b, service switching points 106a-106d, service control points 108a-108b, a service data point 110, and an intelligent peripheral 112.

The telephones 102a-102d are each coupled to one of the central offices 104a-104b. As used herein, "each" means every one of at least a subset of the identified items. The telephones 102a-102d support the transmission and reception of voice traffic in the system 100. The telephones 102a-102d may comprise any suitable telephonic device. Also, the use of other devices in the system 100 may be supported, such as the use of wireless telephones, fax machines, or computing devices.

The central offices 104a-104b are each coupled to various ones of the telephones 102a-102d. The central offices 104a-104b comprise switches that support and provide telephony services, often for a particular locality. For example, each of the central offices 104a-104b could provide telephony services for a particular neighborhood or city. Local telephone calls are typically handled by a single one of the central offices 104a-104b or by two central offices. Long distance telephone calls are typically routed between two central offices 104a-104b by a long distance carrier's network. In addition, each of the central offices 104a-104b may support supplemental calling features, such as call waiting, call forwarding, caller identification, and voicemail.

The service switching points 106a-106d are each coupled to various ones of the central offices 104a-104b, the service control points 108a-108b and/or the intelligent peripheral 112. The service switching points 106a-106d comprise switches that route telephone calls within the system 100. For example, each of the service switching points 106a-106d may communicate with other service switching points 106a-106d to set up, manage, and release circuits required to complete a long distance telephone call. Although in this embodiment the central offices 104a-104b are illustrated separately from the service switching points 106a-106d, it will be understood that the central offices 104a-104b may be implemented as service switching points 106a-106d without departing from the scope of the present invention.

The service control points 108a-108b are each coupled to various ones of the service switching points 106a-106d, the service data point 110 and/or the intelligent peripheral 112. The service control points 108a-108b store data used by the service switching points 106a-106d to route calls in the system 100. For example, when one of the telephones 102a-102d initiates a telephone call, one or more of the service switching points 106a-106d may send a query message to one of the service control points 108a-108b to determine how to route the call. The service control point may respond by identifying the routing number associated with the dialed number. As a particular example, when a person dials a toll-free telephone number (such as a 1-800 number), a query is sent to one of the service control points 108a-108b. The service control point then identifies the actual telephone number that corresponds to the toll-free number.

The service data point 110 is coupled to the service control point 108a. The service data point 110 comprises a specialized database server that contains additional data used in the system 100. For example, the service data point 110 may comprise a database that stores large volumes of subscriber data that can be accessed and used by the service control points 108a-108b.

The intelligent peripheral 112 is coupled to various ones of the service switching points 106a-106d and/or the service control points 108a-108b. The intelligent peripheral 112 supports any of a wide variety of additional functions in the system 100. For example, the intelligent peripheral 112 could comprise a specialized network resource.

In general, various components in the system 100 may transmit and/or receive signaling messages associated with different signaling protocols. For example, the service switching points 106a-106d may receive signaling messages indicating that a person using one of the telephones 102a-102d is attempting to place a telephone call. As a particular example, the service switching points 106a-106d may receive signaling messages using the Plain Old Telephony System (POTS) signaling protocol, the Session Initiation Protocol (SIP) signaling protocol, the ISDN (Integrated Services Digital Network) User Part (ISUP) signaling protocol and/or any other suitable protocol.

At least one of the components in the system 100 includes a generic application programming interface (API). The generic API uses object-oriented concepts to take into account the various differences between the different signaling protocols, which allows a single API to support the use of multiple signaling protocols. Also, when a new signaling protocol is added to the system 100, the existing classes in the generic API can be reused and extended to support the specific requirements of the new signaling protocol. This may help to reduce the expense of using the new signaling protocol, reduce delays in using the new signaling protocol, and decrease the cost of maintaining the system 100.

While FIG. 1 illustrates one configuration of the communication system 100, the system 100 may have many other configurations. For example, the system 100 may have any number of telephones, central offices, service switching points, service control points, service data points and/or intelligent peripherals. Also, various ones of these components may be omitted from the system 100, and the various components may be coupled together in any manner.

Figure 2:
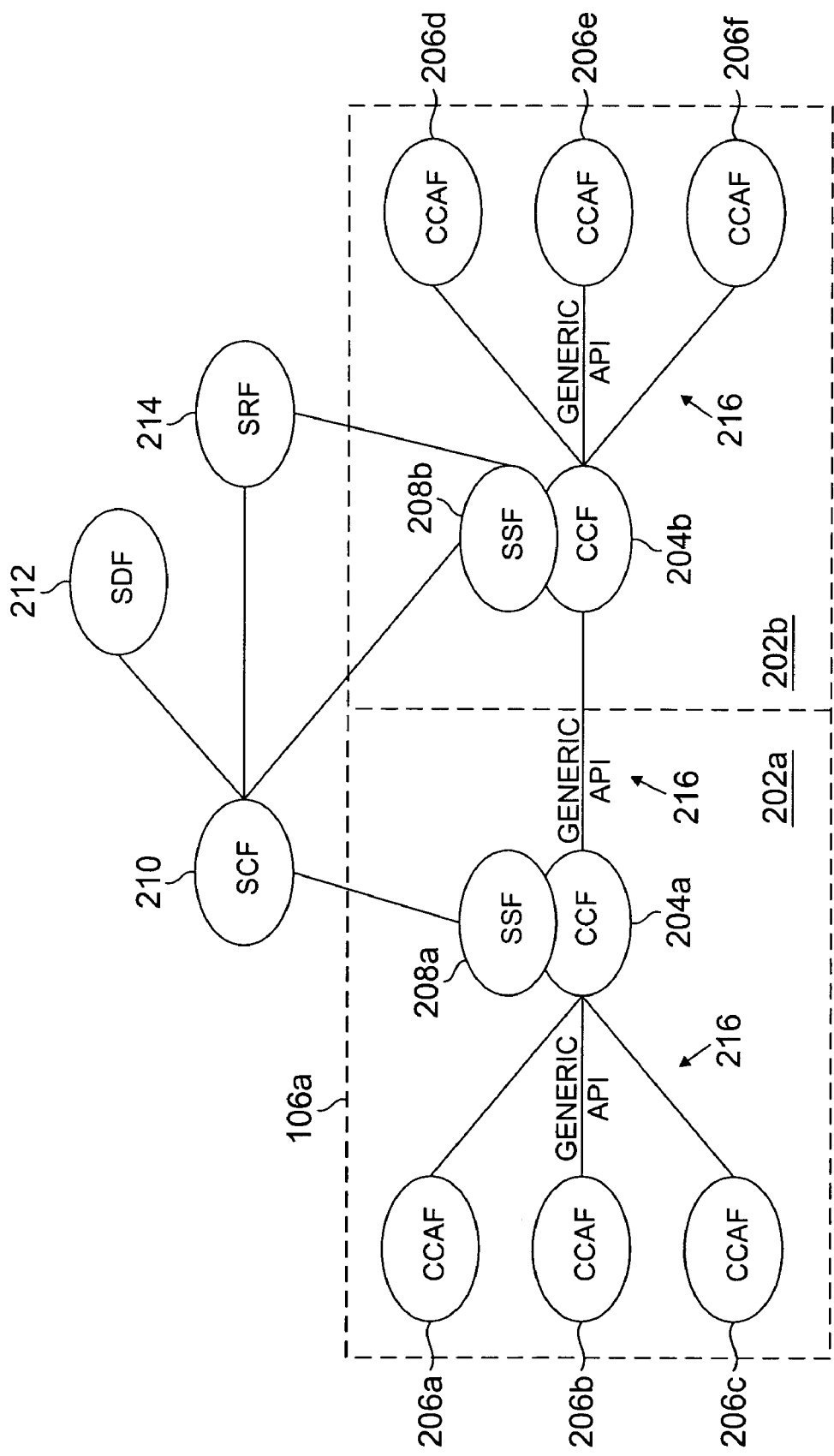
FIG. 2 is a block diagram illustrating a telecommunication switch model according to one embodiment of the present invention.

FIG. 2 illustrates a telecommunication switch model according to one embodiment of the present invention. In particular, FIG. 2 illustrates a model that represents the service switching point 106a from the system 100 of FIG. 1. In this example, the service switching point 106a complies with the International Telecommunication Union—Telecommunications (ITU-T) Capabilities Set 1 (CS-1) architecture.

For ease of explanation, the service switching point 106a is described as including an originating side 202a and a terminating side 202b. The originating side 202a represents the side of the service switching point 106a that faces the component originating a call, and the terminating side 202b represents the other side of the service switching point 106a. In general, the originating side 202a receives and processes a signaling message. Once processing is complete, a function in the terminating side 202b is selected, and call processing is performed to terminate the call such as to a trunk line. Depending on which component originates a call, the originating side 202a and the terminating side 202b of the service switching point 106a may be reversed.

According to this embodiment, the service switching point 106a comprises two call control functions (CCFs) 204a-204b. The call control functions 204a-204b are responsible for establishing, maintaining, modifying, and releasing telephone calls routed through the service switching point 106a. For example, the call control function 204a may receive a signaling message indicating that a telephone call is being placed, and the call control function 204b facilitates the establishment of a circuit with another component in the system 100. The call control functions 204a-204b also monitor the overall state of telephone calls routed through the service switching point 106a. In addition, the call control functions 204a-204b detect particular triggers associated with a telephone call, such as a trigger representing the invocation of a particular feature or a busy signal.

The service switching point 106a also includes multiple call control agent functions (CCAFs) 206a-206f. The call control agent functions 206a-206f comprise an interface between customers' telephones 102a-102d or other components in the system 100 and the call control functions 204a-204b in the service switching point 106a. The call control agent functions 206a-206f interact with the customers or other components so that telephone calls may be established, maintained, modified, and released. For example, the call control agent functions 206a-206f may receive signaling messages indicating that customers are attempting to place telephone calls, and the call control agent functions 206a-206f forward the messages to the call control functions 204a-204b for processing.

In addition, the service switching point 106a comprises service switching functions (SSFs) 208a-208b. The service switching functions 208a-208b allow the service switching point 106a to interact and communicate with one or more service control points 108a-108b. For example, when the call control functions 204a-204b detect triggers associated with telephone calls, the call control functions 204a-204b pass the triggers to the service switching functions 208a-208b. The service switching functions 208a-208b then allow the service switching point 106a to pass the triggers to one of the service control points 108a-108b and access the functionality of that service control point 108a-108b.

The service switching functions 208a-208b interact with a service control function (SCF) 210. The service control function 210 executes logic for various intelligent network services and may influence the call processing performed by the service switching point 106a. For one embodiment, the service control function 210 comprises the functionality of a service control point 108a-108b.

The service control function 210 may interact with a service data function (SDF) 212 and a specialized resource function (SRF) 214. The service data function 212 provides data to the service control function 210, such as data related to customers or the system 100. For one embodiment, the service data function 212 comprises the functionality of a service data point 110. The specialized resource function 214 provides additional functionality in the system 100, such as speech analysis or conference calling functions. For one embodiment, the specialized resource function 214 comprises the functionality of an intelligent peripheral 112.

As shown in FIG. 2, the service switching point 106a includes multiple call control agent functions 206a-206f. The call control agent functions 206a-206f may support different signaling protocols. For example, call control agent functions 206a and 206d may support the POTS signaling protocol, call control agent functions 206b and 206e may support the SIP signaling protocol, and call control agent functions 206c and 206f may support the ISUP signaling protocol.

According to the present invention, the call control functions 204a-204b may be accessed using a generic API 216, as opposed to a custom interface for each protocol. The call control functions 204a-204b may be accessed by the call control agent functions 206a-206f, the service switching functions 208a-208b, each other and/or any other suitable component. In general, the call control functions 204a-204b transmit and receive signaling control primitives, which may vary from one signaling protocol to another. For example, many signaling protocols define signaling control primitives that correspond to one of the telephones 102a-102d going off-hook, a number being dialed, and one of the telephones 102a-102d going on-hook. In a particular embodiment, the generic API 216 uses object-oriented concepts to define these signaling control primitives.

Through the use of object-oriented concepts, classes in the generic API 216 may be mapped to different signaling protocols. Various classes in the generic API 216 may be reused to support multiple signaling protocols. Also, various classes may be extended to take into account unique or different aspects of the signaling protocols. By reusing classes in the generic API 216, programmers need not develop and redevelop the same functionality. By extending classes in the generic API 216, programmers can take the differences between the signaling protocols into account. To add support for a new signaling protocol to the service switching point 106a, the programmers may be able to simply reuse some existing classes and extend other existing classes. In this way, the generic API 216 can be easily adjusted to account for unique signaling control primitives in the new protocol.

Figure 3:
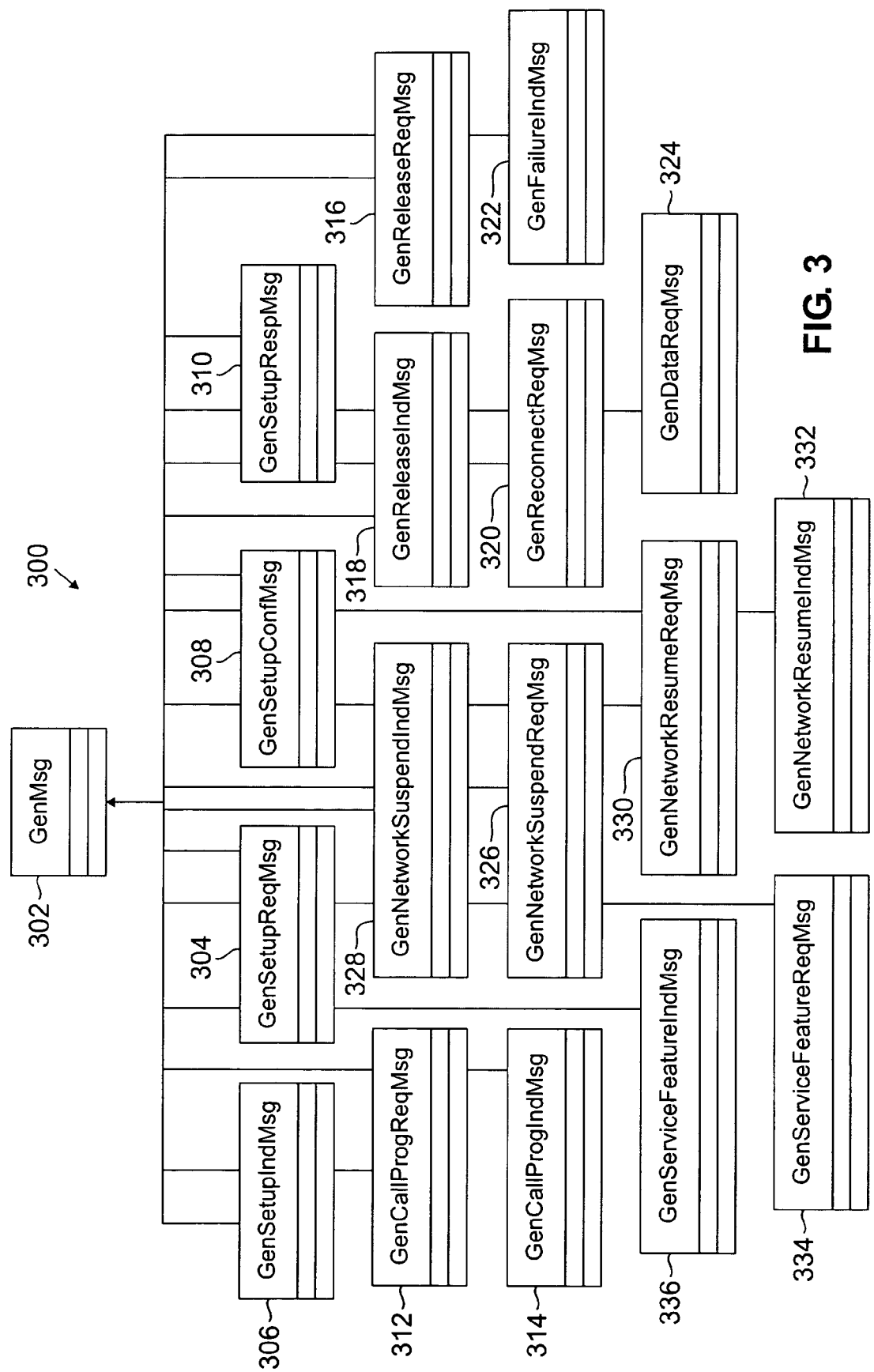
FIG. 3 is a block diagram illustrating a generic object-oriented interface according to one embodiment of the present invention.

FIG. 3 illustrates a generic object-oriented interface 300 according to one embodiment of the present invention. In particular, the generic object-oriented interface 300 shown in FIG. 3 comprises one embodiment of the generic API 216 in the service switching point 106a of FIG. 2.

In general, the call control functions 204a-204b and the call control agent functions 206a-206d communicate and exchange signaling control primitives. In the generic object-oriented interface 300, a generic message 302 forms the basis of the messages communicated between the call control functions 204a-204b and the call control agent functions 206a-206d. Additional messages 304-336 are all derived from the base class defining the generic message 302. Each of the additional messages 304-336 contains data that represents a signaling control primitive defined in one or more of the signaling protocols.

According to this embodiment, the generic object-oriented interface 300 includes a generic call setup request message 304, a generic call setup indicator message 306, a generic call confirmation message 308, and a generic call response message 310. As an example, these messages 304, 306, 308 and 310 are used when a customer using one of the telephones 102a-102d initiates a telephone call.

The generic object-oriented interface 300 also includes a generic call progress request message 312 and a generic call progress indicator message 314. As an example, these messages 312 and 314 are used to request and indicate the current status of a call in progress. A generic release request message 316 is used to request that a circuit for a particular call in progress should be released, thereby ending the call. A generic release indicator message 318 is used to indicate the status of that request.

A generic reconnect request message 320 is used to initiate the reconnection of a call, such as a call that had been placed on hold. A generic failure indicator message 322 is used to indicate that a failure has occurred, such as a failure to form a circuit during a call request. A generic data request message 324 is used to request data needed to satisfy a particular signaling message.

A generic network suspend request message 326 is used to request that the service switching point 106a be suspended, and a generic network suspend indicator message 328 is used to indicate the status of the request. This may be useful when, among other things, a link coupled to the service switching point 106a goes down or becomes inoperative. A generic network resume request message 330 is used to request that the service switching point 106a be reactivated, and a generic network resume indicator message 332 is used to indicate the status of the request. This may be useful when, among other things, a link coupled to the service switching point 106a comes back up or becomes operative again. Finally, a generic service feature request message 334 is used to request a particular service, such as a service provided by the service control points 108a-108b. A generic service feature indicator message 336 is used to indicate the status of this request.

The messages 302-336 shown in FIG. 3 are each associated with a class defined in the generic object-oriented interface 300. Each class may be used to create an object used to represent a signaling control primitive that is provided to one of the call control functions 204a-204b. The particular information contained in these objects may vary depending on the particular signaling protocol being used. For example, one version of the generic setup request message 304 may contain particular information for one signaling protocol. If another signaling protocol defines a primitive containing other or additional information, another version of the generic setup request message 304 may contain information for that signaling protocol. In this way, a programmer may need to only reuse and/or extend various messages 304-336 in the generic object-oriented interface 300 in order to use a new signaling protocol.

While FIG. 3 shows some examples of the various messages that could be used in the generic object-oriented interface 300, it will be understood that other or additional messages may also be used.

Figure 4:
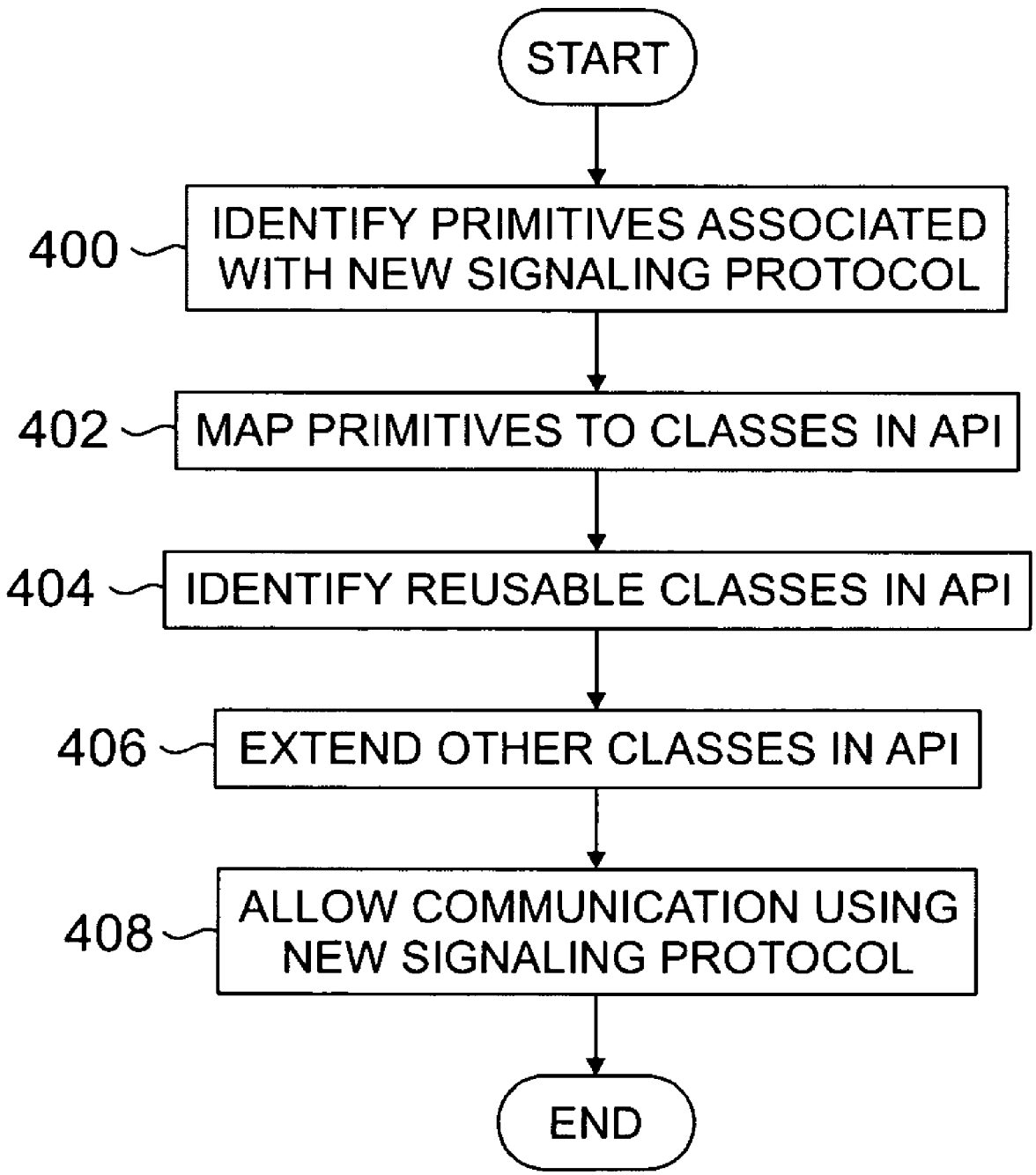
FIG. 4 is a flow diagram illustrating a method for supporting multiple protocol-specific signal control functions according to one embodiment of the present invention.

FIG. 4 is a flow diagram that illustrates a method for supporting multiple protocol-specific signal control functions according to one embodiment of the present invention. The method begins at step 400 where a programmer or other user, a computing system, or other entity identifies one or more signaling control primitives associated with a new signaling protocol to be used in the system 100. At step 402, the identified signaling control primitives are mapped to existing classes in the generic API 216.

At step 404, the programmer or other user, computing system, or other entity identifies reusable classes in the generic API 216. A reusable class in the generic API 216 comprises a class that may be used to represent a signaling control primitive without modification. At step 406, the programmer or other user, computing system, or other entity identifies classes in the generic API 216 that can be extended and extends those classes. An extended class in the generic API 216 comprises a class that may be used to represent a signaling control primitive with some modification.

At step 408, communication using the new signaling protocol is allowed. By reusing and extending various classes in the generic API 216, a telecommunication switch may now support the new signaling protocol.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a telecommunication network, a switch comprising:
   a plurality of call control agent functions, at least three of the call control agent functions associated with different signaling protocols, the signaling protocols defining a plurality of signaling control primitives; and
   a first call control function operable to control routing of telephone calls through the switch, wherein
   the first call control function is accessed by the plurality of call control agent functions using the same application programming interface (API), the API comprising a plurality of classes defining objects representing the signaling control primitives, and
   a second call control function accessed by the first call control function using the API.

2. The switch of claim 1, wherein the plurality of classes comprises a base class and at least one derived class derived from the base class.

3. The switch of claim 2, wherein:
   the base class comprises the only base class in the API; and
   a plurality of derived classes are derived from the base class.

4. The switch of claim 1, wherein the switch comprises a plurality of sides, each side comprising a plurality of call control agent functions and a call control function.

5. The switch of claim 1, further comprising a service switching function, wherein the service switching function is operable to facilitate communication with a service control point.

6. The switch of claim 1, wherein the signaling protocols comprise a Plain Old Telephony System (POTS) signaling protocol, a Session Initiation Protocol (SIP) signaling protocol, and an Integrated Services Digital Network User Part (ISUP) signaling protocol.

7. A telecommunication network comprising a plurality of switches, at least one of the switches comprising:
   a plurality of call control agent functions, at least three of the call control agent functions associated with different signaling protocols, the signaling protocols defining a plurality of signaling control primitives; and
   a first call control function operable to control routing of telephone calls through the switch, wherein
   the first call control function is accessed by the plurality of call control agent functions using the same application programming interface (API), the API comprising a plurality of classes defining objects representing the signaling control primitives, and
   a second call control function accessed by the first call control function using the API.

8. The network of claim 7, wherein the plurality of classes comprises a base class and at least one derived class derived from the base class.

9. The network of claim 8, wherein:
   the base class comprises the only base class in the API; and
   a plurality of derived classes are derived from the base class.

10. The network of claim 7, wherein the at least one switch comprises a plurality of sides, each side comprising a plurality of call control agent functions and a call control function.

11. The network of claim 7, wherein the at least one switch further comprises a service switching function, wherein the service switching function is operable to facilitate communication with a service control point.

12. The network of claim 7, wherein the signaling protocols comprise a Plain Old Telephony System (POTS) signaling protocol, a Session Initiation Protocol (SIP) signaling protocol, and an Integrated Services Digital Network User Part (ISUP) signaling protocol.

13. The network of claim 7, wherein the at least one switch comprises one of a service switching point and a central office switch.

14. For use in a telecommunication switch, a method comprising:
- identifying a plurality of signaling control primitives associated with a signaling protocol;
- identifying one or more first classes associated with an application programming interface (API) to a call control function in a switch;
- extending one or more second classes associated with the API, the one or more first classes and the one or more second classes defining objects representing the signaling control primitives; and
- allowing access to the call control function using the signaling protocol from a second call control function;
- wherein the first and second classes facilitate access to the call control function by a plurality of call control agent functions, at least three of the call control agent functions associated with different signaling protocols.

15. The method of claim 14, wherein the first and second classes comprise a single base class and a plurality of derived classes derived from the base class.

16. The method of claim 14, wherein the signaling protocol comprises one of a Plain Old Telephony System (POTS) signaling protocol, a Session Initiation Protocol (SIP) signaling protocol, and an Integrated Services Digital Network User Part (ISIJP) signaling protocol.

17. The method of claim 14, wherein:
- the signaling protocol comprises a first signaling protocol; and
- the one or more first classes are associated with both the first signaling protocol and a different second signaling protocol.

* * * * *

UNITED STATES PATENT AND TRADEMARK OFFICE
CERTIFICATE OF CORRECTION

PATENT NO. : 7,454,007 B2  Page 1 of 1
APPLICATION NO. : 10/810493
DATED : November 18, 2008
INVENTOR(S) : Michael D. McKinley and Matt M. Wu It is certified that error appears in the above-identified patent and that said Letters Patent is hereby corrected as shown below:

Column 10, claim 16, line 12, delete "(ISIJP)" and replace with --(ISUP)--.

Signed and Sealed this

Eighth Day of December, 2009

David J. Kappos
*Director of the United States Patent and Trademark Office*